US006460788B1

(12) United States Patent
de Feraudy

(10) Patent No.: US 6,460,788 B1
(45) Date of Patent: Oct. 8, 2002

(54) METHOD AND INSTALLATION FOR SEPARATING ALL CATEGORIES OF POLYMER MATERIALS

(75) Inventor: Hugues de Feraudy, Charentay (FR)

(73) Assignee: Galloo Plastics S.A., Halluin (FR)

( * ) Notice: Subject to any disclaimer, the term of this patent is extended or adjusted under 35 U.S.C. 154(b) by 0 days.

(21) Appl. No.: 09/600,532
(22) PCT Filed: Jan. 22, 1999
(86) PCT No.: PCT/FR99/00136
§ 371 (c)(1),
(2), (4) Date: Jul. 18, 2000
(87) PCT Pub. No.: WO99/37452
PCT Pub. Date: Jul. 29, 1999

(30) Foreign Application Priority Data

Jan. 22, 1998 (FR) .............................................. 98 00874

(51) Int. Cl.[7] .............................................. B02C 19/12
(52) U.S. Cl. .............................. 241/19; 241/20; 241/25
(58) Field of Search ................................ 241/20, 24.18, 241/24.28, 19, 25

(56) References Cited

U.S. PATENT DOCUMENTS 5,236,603 A * 8/1993 Sampson ...................... 241/19

FOREIGN PATENT DOCUMENTS

DE          43 29 270 A1    8/1994
WO          WO 98/03318     1/1998

* cited by examiner

*Primary Examiner*—Mark Rosenbaum
(74) *Attorney, Agent, or Firm*—Cummings & Lockwood

(57) ABSTRACT

The invention concerns a method for separating all categories of polymer materials derived from waste characterised by successive steps and phases, implemented in the following order: sequentially, a grinding step is followed by a cylindrical drum form factor mechanical separation step, which is followed by a first density separation step in parallel steps, followed by energetic cleaning of the polymer materials and ending with a second density separation step in parallel steps. Said polymer materials can, if required, be extruded. The method enables to obtain different categories of polymer materials, and in particular PE, PP, PS, ABS, PP filled at 20 to 40% with PA, PMMA, Xenoy™, PVC.

31 Claims, 3 Drawing Sheets

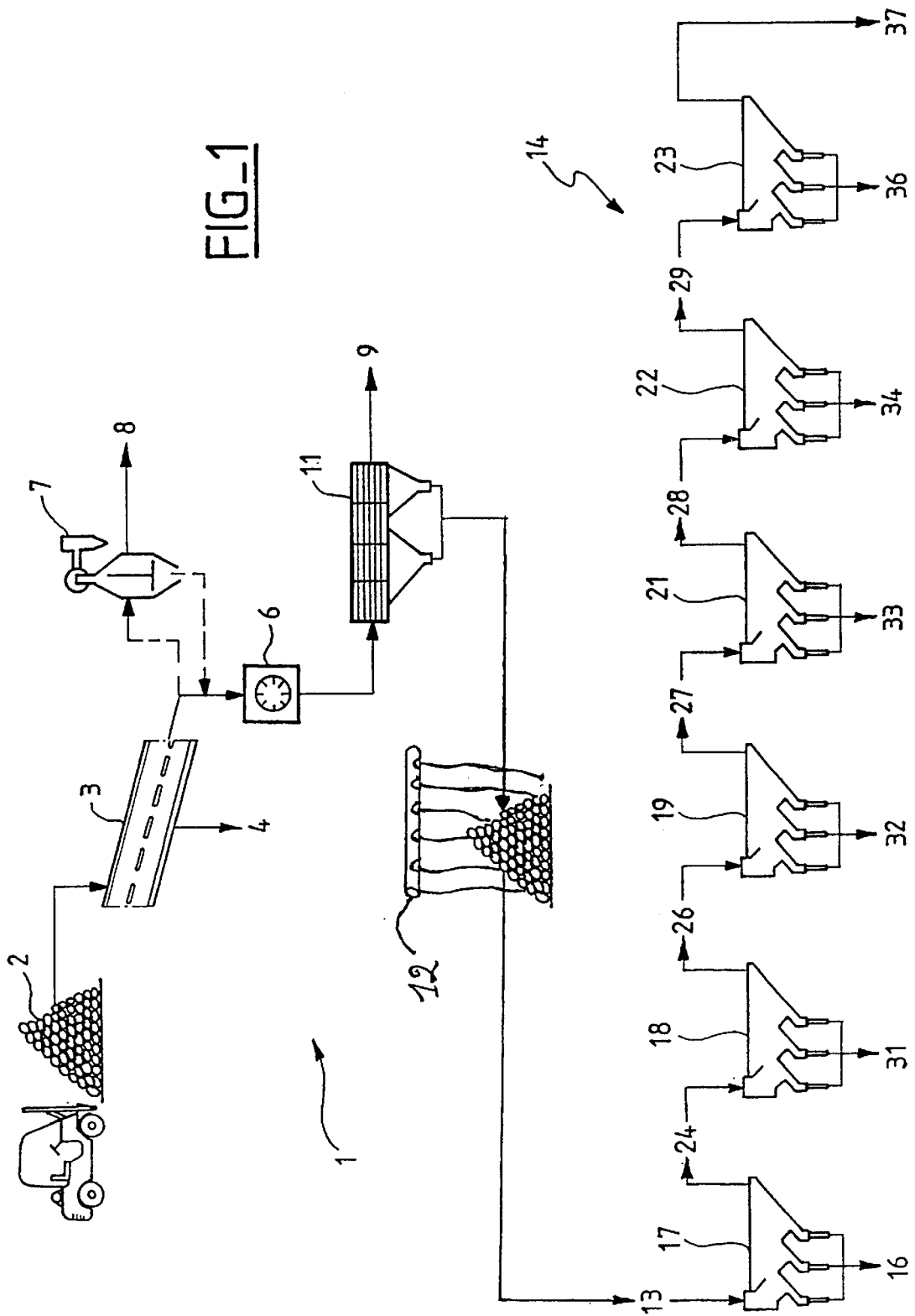

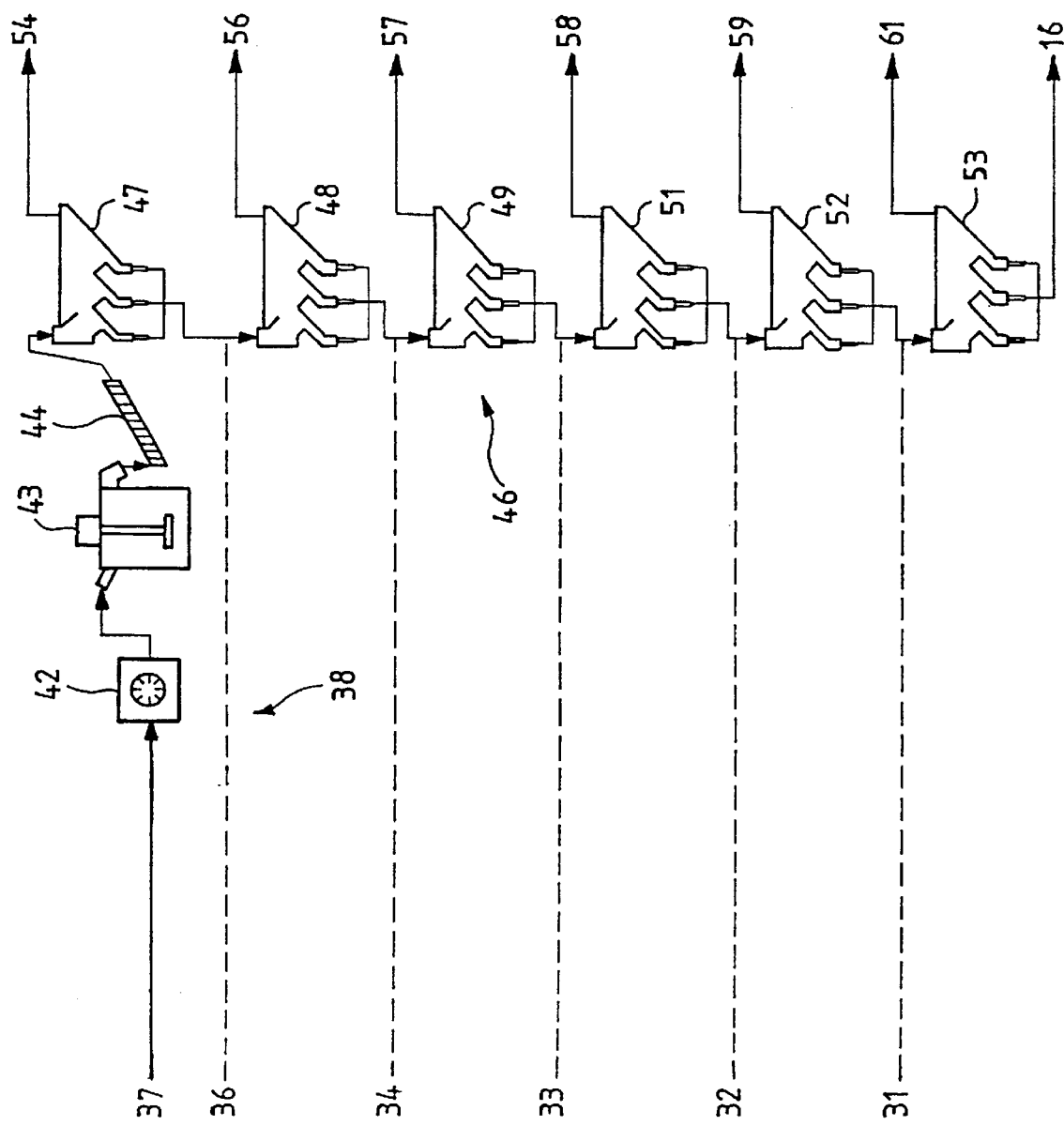
FIG_2

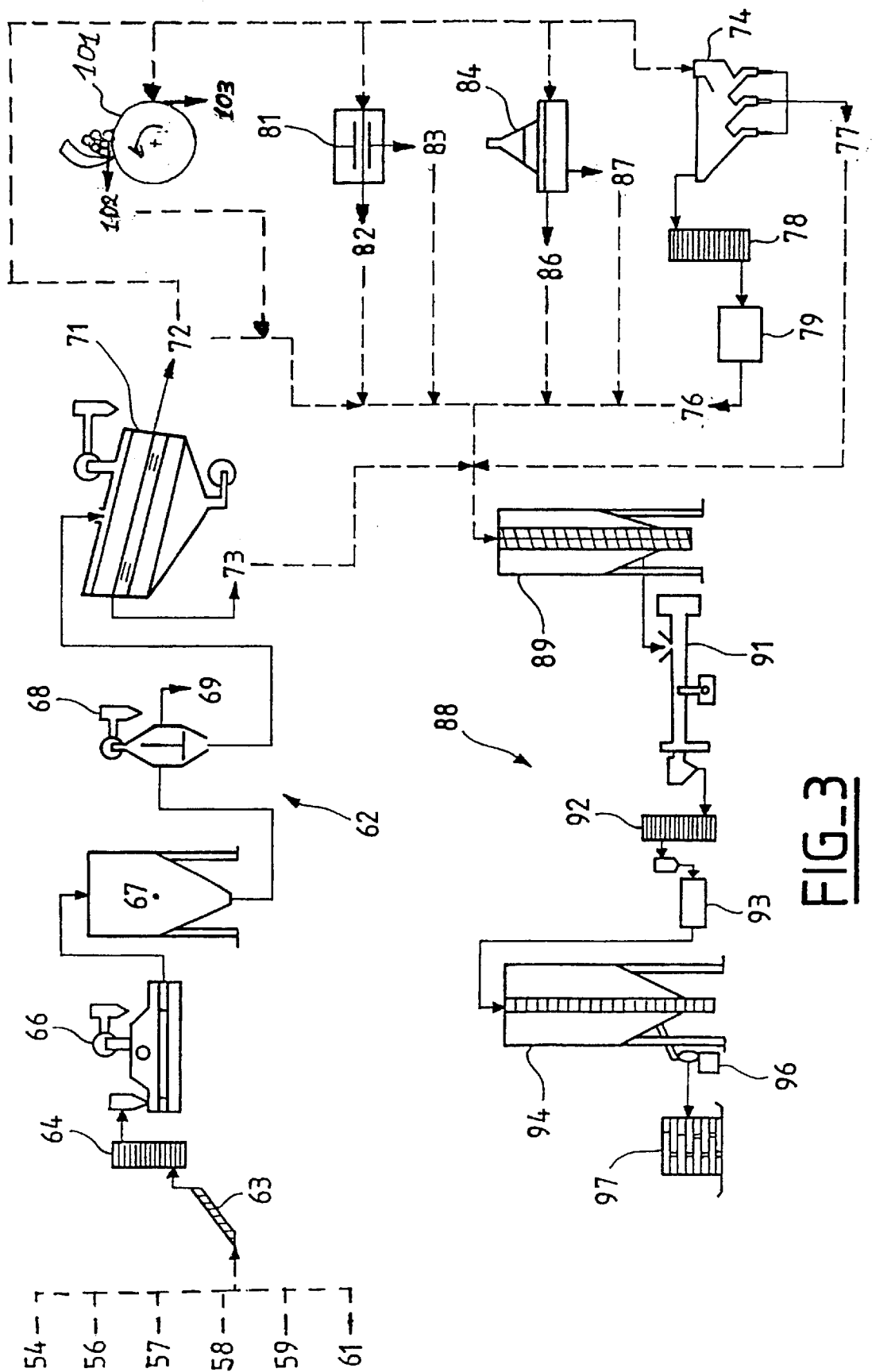
FIG_3

METHOD AND INSTALLATION FOR SEPARATING ALL CATEGORIES OF POLYMER MATERIALS

The present invention relates to a process intended to separate all categories of polymer materials originating from waste.

The invention additionally relates to a plant intended to carry out the process for separating all the categories of polymer materials.

The recycling industry relates to the selective recovery of numerous categories of polymer materials, for example, such as polyethylene (PE), polypropylene (PP), polypropylenes comprising 20 to 40% of talc as filler (PPT), acrylonitrile-butadiene-styrene (ABS), polystyrene (PS), polyamides (PA), poly(methyl methacrylate) (PMMA), poly (vinyl chloride) (PVC), polyurethanes (PU), Xenoy™ (polycarbonate and polyester alloy) and others besides.

The invention relates to a process in stages and to a corresponding plant which ensure the upgrading of spent polymer materials originating from all types of waste and more particularly from motor vehicles. It consequently relates to carrying out a very selective separation of mixtures of polymer materials according to their components and also the conversion of these polymer materials into materials which can be reused or reintroduced in a new manufacturing cycle.

STATE OF THE ART

The sorting of polymer materials can be carried out in several ways. Techniques include manual sorting, sorting after cryogenic grinding, sorting with electrostatic processes, sorting by infrared analysis or by laser radiation, density sorting and sorting according to colour and according to shape. Interest will be more particularly shown in the high-throughput sorting of very large volumes of polymer materials of different natures present and mixed among various other materials.

A plant for recycling polymer materials is known from DE-A-4,329,270, this plant comprising in particular a grinder, a carry-over tank for removing the heaviest materials, an air-flow separator for separating the polymers in the form of sheets, and then density separators. On the one hand, in the carry-over tank, polymer materials with a density of greater than 1 can be removed despite their advantages and, on the other hand, there is no cleaning device for polymer materials. This cleaning device proves to be essential in the case of waste originating from public waste dumps or from motor vehicle breakers' yards.

U.S. Pat. No. 4,728,045 discloses a process for recovering synthetic materials originating from bottles made of polymer materials. A grinding operation, an air-flow separating operation, in order to remove the light materials, such as paper and PP in film form, two separating operations by flotation in a medium with a specific density, in order to separate the PE from the poly(ethylene terephthalate) (PET), and a further aerodynamic separating operation are successively carried out. This process can be applied only to bottles made of polymer materials with a composition of polymer materials precisely determined at the start.

A process for separating polymer materials originating from containers is known from WO-A-92/22 380. This process comprises a grinding stage, an air-flow separating stage, a stage of cleaning the materials and several density separating stages. This process can be applied only to one type of starting substrate with a precisely known composition of polymer materials.

The document Kunststoffberater, 38, June 1993, No. 6, pages 26 to 30, describes a plant comprising a grinder, a washer and density separators. The washer has a rotary-drum device. However, the starting substrate comprises from 95 to 100% of PVC and from 0 to 5% of impurities. This plant is designed only for the separation of PVCs.

The document Kunststoffe, 80, April 1990, No. 4, pages 493 to 495, describes a plant for separating polymer materials, which plant is substantially identical to the preceding plant, comprising a grinder, a cleaning device in the form of a rotary drum with nozzles and density separators.

A process for separating polymer materials is known from FR-A-2,599,279. After grinding and washing, centrifuging takes place in a hydrocyclone, followed by sorting by virtue of a jigging screen.

AT-363,051 presents a process for recovering synthetic materials which consists of a grinding operation, a first flotation operation, a washing operation and a further grinding operation, followed directly by a second flotation operation. These processes give results which are insufficient in terms of quality of the polymer materials obtained after separation.

However, none of these processes cited gives satisfactory results. They are slow or require a very large initial investment. They are also inapplicable to high-throughput sorting and therefore cannot be directly adapted to the industrial scale. Thus, it appears that no separating process of the prior art can be used for sorting mixtures of a wide variety of polymer materials originating from the grinding of motor vehicles or from other sources of waste. Furthermore, they appear to be dedicated to a single or at most to two categories of polymer materials, the other materials being for this reason discharged into the environment.

ACCOUNT OF THE INVENTION

The problem posed is to provide a process and a corresponding plant for separating complex mixtures of polymer materials of all types which make it possible to separate, purify and obtain all categories of polymer materials. The process and the plant must be effective on an industrial scale and must give a degree of purity of the many different polymer materials similar to the degree of purity of the polymer materials of the first melting process (i.e. initial polymer materials).

The aim of the invention is to overcome the lack of efficiency of the existing techniques by using and by placing, in an appropriate way, an additional mechanical separation stage and two specific phases of density separation in a sequence of cleaning and grinding stages.

According to the invention, the process for separating all categories of polymer materials originating from waste is characterized by the following stages and phases which can be carried out in any order: a grinding stage, a stage of mechanical separation by a shape factor, a cleaning stage and two phases of density separation, in which phases the density is gradually varied in an increasing direction or in a decreasing direction.

These five main stages and phases can be arranged according to several different possibilities. It is possible to begin with a stage of mechanical separation by a shape factor, followed in any order by the other stages or phases envisaged. Alternatively, a grinding stage is followed by a stage of mechanical separation by a shape factor and these two stages are subsequently followed in any order by a stage of cleaning the polymer materials and by two density separation phases. One order has given particularly satisfactory results: a grinding stage is followed by a stage of mechanical separation by a shape factor, which is followed by a first phase of density separation, subsequently followed by a stage of cleaning the polymer materials and finally followed by a second phase of density separation.

In the first phase of density separation, the density is gradually decreased from 1.25 to 1. In the second phase of density separation, the density is gradually increased from 1 to 1.25. The first and/or the second phase of density separation can comprise several stages connected in parallel, the densities then taking discrete values stepwise from one stage to another stage. Alternatively, the first and/or the second phase of density separation can also each be carried out in a single density separator, the density varying continuously according to a smooth or stepwise function. In the latter case, the stages correspond to specific choices of densities, in which choices the choice is made to recover and to remove from the single separator the materials with a density greater than or less than the density value which is specifically chosen and for this reason achieved in the separator. Each of the stages of the first phase is connected in series with each of the stages of the second phase.

The two phases of density separation are preferably carried out by one or more flotation operations in liquid medium. The polymer materials, mixed with other materials, are immersed in a bath. The density of the bath is controlled and adjusted, which makes it possible to separate a material which will float on the surface, with a density lower than that of the liquid medium, from another material which will sink, with a density greater than that of the liquid medium. The materials of interest, which float or which sink, are recovered and are subsequently subjected to further treatments. The density separations can also be carried out by virtue of a mechanical device comprising a densimetric table.

The stage of mechanical separation by a shape factor takes place in particular by virtue of screening means comprising a rotary drum with a calibrated grating which makes it possible to remove all the materials which are too large.

The stage of cleaning the polymer materials makes it possible to restore to the latter a surface which is identical to the surface of materials from a first melting process, that is to say a surface devoid of damaged layers, of paint, of grease, and the like. The cleaning is carried out in liquid medium, preferably with vigorous stirring, at high temperature, in liquid medium with precise compositions.

In order to further refine the separation, to remove the maximum amount of impurities of all sizes and of all materials, and in order to obtain an optimized process, other additional purification stages can be inserted among the main stages. One or more wetting or grinding stages, air-flow separation stages in order to remove the lightest particles or the densest lumps, an electrostatic sorting stage, an optical sorting stage, a stage of separation between two thermoplastics or between thermoplastics and thermosetting plastics by differential melting, a stage of separation by ballistic sorting, a stage of separation by sorting in a fluidized bed, a stage of separation by cryogenic grinding, a stage of density separation by virtue of a mechanical device, rinsing and draining stages, a stage of centrifuging in order to remove any liquid, a drying stage and a stage of storage in a silo are appropriately placed in the line.

In order to obtain separated materials of better quality and so as to improve their respective mechanical properties, the polymers are centrifuged and dried, if wet, then they are homogenized, extruded, centrifuged, graded ("compounded") and again homogenized and, finally, the purified polymer materials obtained are bagged up.

By virtue of the invention, the precise sequences of each of the separation stages make it possible to obtain highly purified polymer materials at the end of the process. The various constituent stages or phases of the process can be carried out continuously, stage by stage, or these can be carried out in successive batches with shutdowns and storage for brief periods of time of materials after some of these constituent stages. The latter way, which consists in operating batchwise, allows the process to be perfectly suited to the arrival, in the form of waste, of polymer materials of various categories which are present in variable amounts.

In accordance with the invention, the process makes it possible to obtain PE or extruded PE, PP or extruded PP, PS or extruded PS, ABS or extruded ABS, PPs comprising 20 to 40% of filler, PAs, PMMA, Xenoy™, PVC and others besides.

According to a second aspect of the invention, a plant is characterized in that it comprises the devices for grinding, for density separation with flotation, for mechanical separation by screening, for mechanical separation with a rotary drum, for air-flow separation, for cleaning, for density separation with a mechanical device, for electrostatic separation, for separation by optical sorting, for separation by differential melting, for cryogenic grinding, for separation by ballistic sorting, for separation in a fluidized bed, for wetting, for rinsing and for draining, for centrifuging, for drying, for homogenization, for storage, for extrusion, for grading and for bagging up. These devices follow each other in the plant in the order given by the separation process and by its alternative forms. The preceding devices feed the following devices.

Other advantages of the process and of the plant according to the invention will become apparent on reading the detailed implementational example of the invention, with reference to the drawings given by way of illustration, in which:

FIG. 1 represents a first part of the plant employing the process of the invention in which crude separation is begun;

FIG. 2 represents a second part of the plant employing the process of the invention in which a more refined separation is carried out;

FIG. 3 represents a third part of the plant employing the process of the invention in which the final purification stages are carried out.

DETAILED DESCRIPTION OF THE INVENTION

Throughout the plant 1 which will be described below, conveyor belts, screw systems or pneumatic conveying systems, represented solely in the form of arrows, make possible the continuous and high speed transportation of the materials from one device to another. All the stages and their corresponding devices operate continuously or also batchwise, according to the respective throughput of each of the devices. The sequence of the stages given below has given particularly advantageous results in terms of amount and of quality of the polymer materials obtained at the end of the line.

At the start, petrol, oils and coolant are extracted, and cars and/or lorries and/or buses, or alternatively household refuse, are crushed and then broken up.

A pile of waste 2 is obtained, which waste will be treated in order to recover the maximum amount of polymer materials therefrom. In a first stage of mechanical separation by screening, fines, inorganic materials, glass, stones and earth 4 are removed from the pile of waste 2. This operation is carried out in a screen 3 with a square mesh of 10 to 12 mm.

All the free metal pieces and the metals trapped inside other materials are subsequently separated from the non-metallic parts by conventional techniques. A magnetic separator makes it possible to remove the ferrous metals and a Foucault-current separator makes it possible to remove non-ferrous metals, aluminium, and the like (not represented).

The materials are subsequently sent to a stage of grinding in a coarse grinder 6 between 8 and 100 mm, preferably from 10 to 40 mm and on average to 25 mm.

A stage of air-flow separation in a separator 7 of variable power, which makes possible the removal of all the heavy materials 8, is optionally inserted at this point (in dotted lines) between the mechanical separation 3 and the grinding 6. By preferably treating dry materials, this aerodynamic extraction provides for the departure out of the line of dense rubbers, remaining metals or dense wood. A fast and selective first enriching is carried out here, so as to obtain a preconcentrate with an amount, already more advantageous, of 5 to 50% of polymer materials. The power of the air flow is approximately regulated according to the nature of the incoming waste.

A first objective of the preceding screen and aerodynamic separation operations is to avoid grinding any material, for example nails, stones, tires, and the like, and a second objective is to achieve savings of energy by decreasing the amount of material to be ground. Nevertheless, pieces of wood, earth adhering to polymer materials, tars, paper, and the like, remain.

The parts 9, such as foams, cellular PUs, cellular rubbers, textiles, yarns, expanded PS, film waste made of polymer materials, or wood, are subsequently removed by a second specific mechanical selection. This operation is a separation by a shape factor which makes possible the removal of all materials which are too large. A screening device 11 makes it possible to carry out this sorting. It comprises, for example, a rotary drum with a calibrated grating, the mesh of which has a size, for example, with a width of 10 mm and a length of 25 cm. In this way, the drum retains, for the purpose of the removal 9, everything which does not have a plate shape and therefore everything which has not been correctly shredded during a preceding grinding operation. The treatment is continued with all the materials which pass through this sorter.

Preferably, at this stage, wood which is present among the polymer material can be densified in order to give it a density of greater than 1, in order to subsequently remove it by a separation according to the criterion of density. For this, a wetting operation is carried out, for example using a device which sprays water 12 onto the pile of waste. Conveying means can also be taken advantage of for continuous spraying. The process can also be carried out by immersion of the waste or by mechanically defibring the wood by slushing, for example using a turbine. An alkaline solution based on KOH or NaOH, the aim of which is to begin hydrolysis of the cellulose fibres of the wood, can be used for this wetting operation. The objective is to destructure this material in order to give it a density of greater than 1. Materials 13 are obtained.

The materials 13 are sent to a first phase 14 of density separation. The desire is to recover, by this phase 14, a significant amount of polymer materials with a density of less than, for example, 1.25. PVC, PP comprising 50% of talc as filler, dense wood and other sterile materials 16 are removed. Mainly the polymers with d≦1.25 are recovered and selectively separated, in particular:

PU foams (d=0.02 to 0.035),

PP (d=0.9),

PE (d=0.92 to 0.95), ethylene/vinyl acetate EVA, ethylene/propylene, propylene/ethylene/ propylene rubber or ethylene/propylene/diene monomer EPDM copolymers, PE foams, PP foams, filler-free PS (d=1.05), filler-comprising polyolefins with d>1, PP comprising 20% of talc as filler (d=1.05), filler-free ABS (d=1.07), polycarbonates, PC (d=1.2), rubbers, filler-comprising PE, unsaturated PET polyesters (d=1.10 to 1.3), polyamides, $PA_6$ (d=1.13), $PA_{6,6}$ (d=1.14), $PA_{6,10}$ (d=1.08), $PA_{12}$ (d=1.04) or $PA_{12}$ (d=1.02), with or without fillers, PMMA (d=1.18), saturated polyesters (d≧1.2), which may or may not comprise glass fibres as fillers, filler-comprising PUs (d=1.21).

In order to recover virtually all the categories of polymer materials, the first phase of density separation 14 comprises several stages of density separation connected in series. The density is staggered, decreasing from one stage to another stage from 1.25 to 1.

The choice was made to use flotation hydraulic separators. For d=1, the liquid medium preferably comprises water. For d>1, the liquid medium of the hydraulic separator comprises water, wetting agents and inorganic compounds, such as clays, bentonite or soluble compounds, such as salts, and the like, which compounds are used to increase the density of water. (Quarry) clay is preferably used. The latter is suspended in water and the heaviest clay particles, which accumulate at the bottom of the receiver, are removed in order to obtain a homogeneous medium. The density is subsequently adjusted by adding water. The role of the wetting agent is also to keep the clay in suspension. The agent used is SP 30 S™ from the company Coatex.

In this first phase, 6 fixed-density flotation separators correspond to 6 separate stages and to 6 density levels, for example. In the first separator 17, the density is substantially 1.25. In the second, 18, the density is substantially 1.18. In the third, 19, the density is substantially 1.15. In the fourth, 21, the density is substantially 1.10. In the fifth, 22, the density is substantially 1.05. In the sixth and last flotation separator 23, the density is substantially equal to 1.

The first phase of density separation 14 can also be carried out in a single density separator in which the density is gradually and continuously varied in a decreasing direction. The density is decreased by automatic addition of a precise amount of water. The fall in density is halted for a short while and the materials are collected at the given density chosen, which corresponds to a stage equivalent to those described above. The first phase of density separation 14 can also be carried out with one or more density separators operating continuously, to which one or more other fixed-density separators is/are connected in parallel.

In this first phase 14 comprising density separation stages, the materials 24, having a lower density in the separator 17 with d=1.25, are conveyed in the direction of the second separator 18 which directly follows it. Similarly, the materials 26, having a lower density in the separator 18 with d=1.18, are conveyed in the direction of the third separator 19 which directly follows it. The materials 27, having a lower density in the separator 19 with d=1.15, are conveyed in the direction of the fourth separator 21 which directly follows it. The materials 28, having a lower density in the separator 21 with d=1.10, are conveyed in the direction of the fifth separator 22 which directly follows it. Finally, the materials 29, having a lower density in the separator 22 with d=1.05, are conveyed in the direction of the sixth separator 23 with d=1 which directly follows it.

The higher density materials 16, that is to say which sink in the first separator 17, are discarded as they comprise too much sterile heavy material. The higher density materials 31, that is to say which sink in the second separator 18, are recovered in order to be further purified. They comprise Xenoy™, PCs, PETs, PUs, PP comprising 40% of filler, wood and other materials. Similarly, the higher density materials 32, that is to say which sink in the third separator 19, comprise PMMAs, PUs, wood and other materials. The higher density materials 33, that is to say which sink in the fourth separator 21, comprise PAs, PUs, PP comprising 30% of filler, wood and other materials. The higher density materials 34, that is to say which sink in the fifth separator 22, comprise ABSs, PUs, wood and other materials. The higher density materials 36, that is to say which sink in the sixth separator 23, comprise PS, PP comprising 20% of filler, PUs, wood and other materials. The lower density materials 37, that is to say which float in the sixth and final separator 23 and which comprise PP, PE, foams, fabrics, fibres, textiles, wood and other materials, are also recovered and subsequently purified.

All these materials 31, 32, 33, 34, 36 and 37, listed above with their various categories of polymer materials of high added value, will be successively treated in one or more parallel lines 38 (only one of which is represented in detail, the others in dotted lines being similar) each comprising stages arranged in series.

In order to complete and to refine the size of the polymer pieces, a second optional grinding stage in a finer grinder 42, with a mesh of 5 to 25 mm and on average from 10 to 15 mm, completes the fragmentation of the materials.

An essential intense cleaning stage takes place at this point. This operation is essential as it makes it possible to restore the native surface to the polymer materials in the substrate form. This is because these polymer materials are very often contaminated by tars, earth, lead residues, oils, liquid coolant, acid, diesel oil or petrol. Furthermore, the surfaces of the polymer materials are either covered with paint (the case of PP bumpers) or etched by chemical agents or oxidized or detrimentally affected by UV radiation or alternatively aged. These factors all modify the surface tensions and do not allow the subsequent density separations to be carried out completely efficiently. The stripping treatment is necessary if it is desired that the polymer materials obtained at the end of the separation should have the same physicochemical properties as virgin polymer materials. For this reason, the pieces are introduced into one or more washing and slushing devices 43, for example a Wemco™ device. The latter devices comprise, for example, one or more stationary vessels, rotating paddles and powerful motor means which can develop 0.05 to 0.5 kWh per kg of material to be treated. A liquid medium composed of water, of a cleaning agent and optionally of an abrasive agent is added to the vessels. The washing operation is carried out in a medium which is as concentrated as possible, at room temperature or better still under hot conditions, it being possible for the water to be brought to boiling point by virtue of the heat dissipated by the motors.

The composition of the cleaning medium is preferably:

50 to 70% by weight of mixture of polymer materials;

30 to 50% by weight of liquid phase comprising:

50 to 100% by weight of water, 0 to 20% by weight of cleaning agent, for example sodium hydroxide, potassium hydroxide, sodium carbonate or non-foaming biodegradable soaps, Akypo MB 2621 S™ from the company Chemy, wetting agent (based on fatty alcohols modified with ethylene oxide and/or propylene oxide); and 0 to 30% by weight of abrasive agent, for example minerals such as calcium carbonate powder, talc, silica or alumina.

At the outlet, the polymer materials are rinsed with water and are drained, for example in the extracting screw 44. The water recovered can be reinjected into the washing device 43.

All the materials are subsequently sent to a second phase 46 of density separation. This phase makes it possible to complete the selection already begun during the first flotation separation phase 14. The surfaces of the polymer materials have been cleaned during the preceding stage, which makes it possible to immerse the materials which have been attributed, because of their artefacts, false densities of less than 1. The various categories of polymer materials are separated in this phase, if the density of the liquid medium is precisely adjusted. Removal by sinking of the materials, residual sand previously stuck to the polymers and in particular the coarser part of the wood, also occurs. This wood has been thoroughly eaten away, ground down and impregnated with liquid during the preceding cleaning stage or initial wetting-slushing stage, thus giving it a density of greater than 1.25.

In order to recover virtually all the categories of polymer materials, the second phase of density separation 46 comprises several stages of density separation connected in parallel. The density is staggered, increasing from one stage to another stage from 1 to 1.25.

For this reason, each of the stages of the first phase of density separation 14 is connected in series with each of the stages of the second phase 46. The materials 37, having a lower density in the final stage of density separation of the first phase 14, are conveyed in the direction of the first stage of density separation of the second phase 46. The materials 36, having a higher density in the final stage of density separation of the first phase 14, are conveyed in the direction of the second stage of density separation of the second phase 46. The materials 34, having a higher density in the penultimate stage of density separation of the first phase 14, are conveyed in the direction of the third stage of density separation of the second phase 46 and this series is continued in the same way up to the materials 31, having a higher density in the second stage of density separation of the first phase 14, which are conveyed in the direction of the final stage of density separation of the second phase 46.

The choice was made to use flotation hydraulic separators. For example, 6 fixed-density flotation separators correspond to 6 separate stages and to 6 density levels. In the first separator 47, the density is substantially 1. In the second, 48, the density is substantially 1.05. In the third, 49, the density is substantially 1.10. In the fourth, 51, the density is substantially 1.15. In the fifth, 52, the density is substantially 1.18. In the sixth and last flotation separator 53, the density is substantially equal to 1.25.

Similarly to the first phase, the second phase of density separation 46 can also be carried out in a single density separator, in which the density is gradually and continuously varied in an increasing direction. The density is increased by the automatic addition of a precise amount of clay. The increase in density is halted for a short while and the materials are collected at the given density chosen, which corresponds to a stage equivalent to those described above. The second phase of density separation 46 can also be carried out with one or more density separators operating continuously, to which one or more other fixed-density separators is/are connected in parallel.

In this second phase 46 comprising density separation stages in parallel, the materials, having a higher density in the separator 47 with d=1, are conveyed in the direction of the second separator 48 which directly follows it. Similarly, the materials, having a higher density in the separator 48 with d=1.05, are conveyed in the direction of the third separator 49 which directly follows it. The materials, having a higher density in the separator 49 with d=1.10, are conveyed in the direction of the fourth separator 51 which directly follows it. The materials, having a higher density in the separator 51 with d=1.15, are conveyed in the direction of the fifth separator 52 which directly follows it. Finally, the materials, having a higher density in the separator 43 with d=1.18, are conveyed in the direction of the sixth separator 53 with d=1.25 which directly follows it.

The lower density materials 54, that is to say which float in the first separator 47 and which comprise PE, PP and other materials, are recovered in order to be further purified. Similarly, the lower density materials 56, that is to say which float in the second separator 48, comprise PS, PP comprising 20% of filler, and other materials. The lower density materials 57, that is to say which float in the third separator 49, comprise ABSs and other materials. The lower density materials 58, that is to say which float in the fourth separator 51, comprise PAs, PP comprising 30% of filler, and other materials. The lower density materials 59, that is to say which float in the fifth separator 52, comprise PMMA and other materials. The lower density materials 61, that is to say which float in the sixth and final separator 53 and which comprise Xenoy™, PP comprising 40% of filler, and other materials, are also recovered and subsequently purified. The materials 16, which sink in this same final separator 53 with d=1.25, are discarded.

All these materials 54, 56, 57, 58, 59 and 61 listed above, with their sole or at most their two categories of different and virtually pure polymer materials, will be successively treated in a single or several parallel additional separations and purification, lines 62 (only one being represented) comprising stages arranged in series. Thus, the polymer materials which float at the surface in the second phase of density separation 46 are rinsed and drained in the transportation screw 63, so as to completely remove the adherent clay therefrom. Subsequently, centrifugation is carried out in a centrifuge 64 in order to remove any remaining liquid.

Continuous drying is subsequently carried out. This operation can be carried out with various devices. For example, a fluidized-bed dryer 66, a flash dryer, drying in a Wemco™ slusher, where the rise in temperature is achieved by virtue of the mechanical stirring energy, or a countercurrent dryer of Voom™ type can be used. The remaining dried wood particles will have a density approximately equal to 0.7.

The resulting mass is stored in a holding silo 67, of use if the line breaks down or in the event of shutdown for servicing and maintenance. The process can be halted at the stage of silo storage 67 if it is desired to sell only a mixture of polymers.

An air-flow separation stage, which may be optional, is placed at this point. This stage must be placed after a drying stage. The separator 68 makes possible the removal of all the light materials 69, such as the dust which has remained attached, small fibres and foams, as well as the remaining wood particles.

The stage of mechanical density sorting makes it possible to complete the separation and can be positioned, for example at this point in the line 62. It is preferably carried out in a mechanical device with a densimetric vibrating table 71 from the company Herbold or from the company Eldan, where the circulating charge 72 is discharged. All the remaining circulating light materials, dry wood, foams, rubber and impurities 73, are removed. This mechanical density sorting with a vibrating table 71 can be used to separate two polymer materials according to the density which is specific to them. The process can thus be completed at this point by the production of fairly pure polymers.

A last stage of density separation can also be placed (in dotted lines) in the final sorting phase in order to separate two particularly advantageous materials of high added value among the densities of less than 1: these are the two polyolefins PE and PP 54.The density of the PP is 0.9 and the density of the PE is 0.92 to 0.95. The separation is carried out in a separator in a liquid medium 74 with a very precisely controlled density and therefore between 0.9 and 0.95. The liquid medium preferably comprises water and an alcohol chosen from methanol, ethanol, a wine alcohol, a denatured alcohol or alcohol for incineration. The degree of the water/alcohol mixture used is between 55 and 60°. Monitoring is carried out using an alcoholometer. Adjusting the degree of alcohol makes it possible to optimize the density of the medium in order to obtain a separation which is as selective as possible. The intensive washing which was carried out previously makes possible optimum contact between the native surface of the polymer materials to be treated and the medium of chosen density. A wetting agent is also added to the medium in a proportion of 0.1 to 0.2% by weight. The presence of this wetting agent substantially improves the separation. Antarox-FM3™ from the company Rhône-Poulenc has been preferably used. The advantage of the preceding centrifuging and drying stages, in order for the density of the liquid medium, finely adjusted in the separator, not to be modified by a contribution of stray water, will be better understood. The PP/PE mixture introduced is separated virtually completely. The material which floats at the surface, recovered at the top, is composed of PP 76 and the material which sinks, recovered in the bottom part, is composed of PE 77.

The PP and PE phases are thus separately centrifuged in a centrifuge 78 in order to bring the amount of liquid to approximately 1 to 2%. They are dried in a dryer 79, for example identical to the dryer already described above 66.

A last stage of separation by electrostatic sorting with a sorting electrostatic table 81, for example from the company Hamos Recycling Technique, can also be placed (in dotted lines) in the final sorting phase, in order to separate the materials 72 exiting from the vibrating table 71. The ABS exiting 56 is thus separated 82 in a very exact way from the PP comprising talc as filler 83.

A last stage of separation by optical sorting in a bench 84, for example originating from the company Sortex, can also be placed (in dotted lines) in the final sorting phase, in order to separate the materials 72 exiting from the vibrating table 71, in order to take out filler-comprising polymer materials 87. Indeed, the exiting PS 56 still comprises polyolefins, with a maximum load of filler of 20%, with $1<d\leq1.05$. Generally, filler-comprising PEs and PPs are black in colour. In contrast, the PSs 86 are white in colour, in particular when they originate from domestic electrical appliance waste. This separation can optionally be carried out by electrostatic sorting.

A last stage of sorting between two thermo-plastic materials having different melting points, or between thermo-plastic materials and thermosetting plastic materials, can also be placed (in dotted lines) in the final sorting phase, in order to separate the materials 72 exiting from the vibrating table 71. A differential melting separator 101 makes it possible to separate meltable thermoplastic species 102, which stick to the surface of a rotary drum, from species 103 which do not stick to the surface of the drum, that is to say meltable thermoplastic species having a higher melting point or non-meltable thermosetting species. The metal rotary drum is covered with an anti-adhesive of quasicrystalline type and it is scraped in order to recover solely the molten thermoplastics 102 as polymer materials arrive on its surface. The temperature of the surface of the drum is regulated between 100 and 300° C. and on average at 200° C., according to the melting point of the thermoplastic which it is desired to recover.

A last stage of separation by cryogenic grinding (not represented), giving particles with different sizes according to the polymer material, can also be placed in the final sorting phase, in order to separate the materials 72 exiting from the vibrating table 71. Other possibilities for the use of devices for separation by ballistic sorting or for separation by sorting in a fluidized bed can be employed in this final phase.

The categories of polymer materials 72, 73, 76, 77, 82, 83, 86, 87 and 102, finely sorted by virtue of this plant 1, can either be sold for the purpose of a direct use or can immediately be subjected separately to further treatment stages. In particular, an extrusion-compounding 88 can be carried out, which makes it possible to obtain, for the polymer materials thus treated, mechanical properties which are virtually identical to those of the virgin (pure) polymer materials.

At this point, FIG. 3 represents only the plant needed for the treatment of a single material, it being understood that the other materials are treated in the same way by following the same stages carried out with the same devices.

The polymer material 72, 73, 76, 77, 82, 83, 86, 87, 102 is homogenized by circulation in a silo 89 which is also used for storage. The polymer material is extruded in an extruder 91 in order to manufacture granules. In-line filtration of 20 to 300 μm also takes place in order to remove the final impurities. A test is carried out at this point in order to determine whether the product to be extruded is pure. Various agents can also be introduced: dyes, UV stabilizers, and the like. An air-flow separation stage can optionally be placed between storage and extrusion in order to remove the fibres and dust (not represented). The polymer material is centrifuged in a centrifuge 92 in order to remove the water for cooling the granules. The polymer material exits in the form of granules and is graded in a grader 93 for the removal of fines and agglomerates. The polymer material is again homogenized in a homogenization and storage silo 94. In a final stage, the polymer material is placed in bags of approximately 50 l in a bagging machine 96.

The polymer materials 97 leave as finished products of excellent quality and can be used in their usual applications.

All the hydraulic separators used are so-called static separators. They can be replaced with so-called dynamic hydraulic separators or those comprising a pump and a cyclone in order to produce a circulating sorting flow. All the flotation hydraulic separators can be replaced with vibration separation tables but the materials which are introduced thereon have to be dry. The flotation hydraulic separators can also all be replaced with electrostatic separators, for example from the company Hamos Recycling Technique.

All the devices intended for carrying out the common phases and lines 14, 38, 46, 62 and 88 of the plant 1 can be provided just once, the process then being carried out batchwise, or can be provided several times. For this reason, the parameters for optimization of the separation of these devices will change (densities, circulation rates, extrusion temperatures, and the like).

One or more lines of devices can be assembled in parallel with the first or else these stages can be carried out in campaigns and the polymer materials can alternatively be stored. The latter solution is advantageous if, at the start, there is a significant difference in the rate of arrival of the polymer materials in the form of waste 2. The various constituent stages are carried out continuously, stage by stage, or the various constituent stages can be carried out in successive batches, with shutdowns and storage of materials in silos after some of the constituent stages.

It is found that the quality and therefore the commercial value of the two polyolefinic materials PE and PP is substantially equivalent to the quality of PE and PP of the first melting process. It is the same for the two styrene materials ABS and PS and for all the others, PMMA, Xenoy™, and the like.

Due to the solvents which are optionally used, the plant 1 meets the flameproof standards and the various devices are as leaktight as possible. Throughout the industrial plant described above, the aqueous washing and rinsing liquors, the aqueous liquors recovered after draining and centrifuging, the aqueous condensation liquors from the dryers and the aqueous liquors from the flotation media are either returned to the user device or collected by a pipe in order to provide for their storage and their retreatment in a purification plant.

The invention is not limited by the details of the embodiments and examples chosen in order to illustrate it. Modifications can be made without, however, departing from the scope of the invention. For example, the polymer materials can also originate from household refuse or industrial waste. The densities of the liquids used in the flotation separation devices can be modified according to the nature of the polymer materials which it is desired to recover and to separate.

What is claimed is:

1. Process for separating all categories of polymer materials originating from waste, characterized by the following stages and phases, which can be carried out in any order:

a grinding stage, a stage of mechanical separation by a shape factor for separating materials having a plate shape from waste materials comprising oversized materials, an intensive cleaning stage, and two phases of density separation (14, 46), in which phases the density is gradually varied in an increasing direction or in a decreasing direction, the direction of variation in the density of these two phases being identical or different.

2. Process according to claim 1, characterized in that the said stages are carried out in the following order: a grinding stage, followed by a stage of mechanical separation by a shape factor, which stages are subsequently followed in any order by a stage of cleaning the polymer materials and by the two phases of density separation (14, 46).

3. Process according to claim 1, characterized in that the said stages are carried out in the following order: a grinding stage, followed by a stage of mechanical separation by a shape factor, followed by the first phase of density separation (14), followed by a stage of cleaning the polymer materials and then followed by the second phase of density separation (46).

4. Process according to claim 1, characterized in that the first phase of density separation (14) comprises one or more density separation steps connected in parallel and in that the second phase of density separation (46) comprises one or more density separation stages connected in parallel.

5. Process according to claim 4, characterized in that, in the first phase of density separation (14), the density is decreased stepwise from one stage to another stage or continuously, when this phase is carried out in a single density separator, and in that, in the second phase of density separation (46), the density is increased stepwise from one stage to another stage or continuously, when this phase is carried out in a single density separator.

6. Process according to claim 5, characterized in that, in the density separation stages of the first phase (14), the materials having a density lower than the chosen density value in one of the said stages are conveyed in the direction of the separation stage which directly follows it and in that, in the density separation stages of the second phase, the materials having a density higher than the chosen density value in one of the said stages are conveyed in the direction of the separation stage which directly follows it.

7. Process according to claim 1, characterized in that the first and/or the second phase of density separation (14, 46) is/are carried out in a single density separator.

8. Process according to claim 1, characterized in that each of the stages of the first phase of density separation (14) is connected in series to each of the stages of the second phase of density separation (46).

9. Process according to claim 8, characterized in that the materials (37), having a density lower than the chosen density value in the final density separation stage of the first phase (14), are conveyed in the direction of the first density separation stage of the second phase (46) and in that the materials (36), having a density higher than the chosen density value in the final density separation stage of the first phase (14), are conveyed in the direction of the second density separation stage of the second phase (46) and in that the materials (34), having a density higher than the chosen density value in the penultimate density separation stage of the first phase (14), are conveyed in the direction of the third density separation stage of the second phase (46), and this series is continued in the same way up to the materials (31), having a density higher than the chosen density value in the second density separation stage of the first phase (14), which are conveyed in the direction of the final density separation stage of the second phase (46).

10. Process according to claim 8, characterized in that the materials having a density lower than the chosen density value in each of the stages of the second phase of density separation (46) are recovered and are conveyed in the direction of additional separation and purification stages.

11. A Process according claim 1, characterized in that, in the first phase of density separation (14), the density is staggered from 1.25 to 1 and in that, in the second phase of density separation (46), the density is staggered from 1 to 1.25.

12. Process according to claim 1, characterized in that the phases of density separation (14, 46) are carried out by flotation in a liquid medium, the density of which can be controlled and adjusted, which makes it possible to separate a material which floats on the surface, with a density lower than that of the liquid medium, from another material which sinks, with a density greater than that of the liquid medium.

13. Process according to claim 12, characterized in that the liquid medium for the density separation stages with flotation, the density of which is substantially equal to 1, comprises water and in that the liquid medium for the density separation stages with flotation, the density of which is greater than 1, comprises water, clays or salts and a wetting agent.

14. Process according to claim 1, characterized in that the phases of density separation (14, 46) are carried out by virtue of a mechanical device selected from the group consisting of a vibrating densimetric tables a dynamic hydraulic separator and a separator of the cyclone and pump type.

15. Process according claim 1, characterized in that the stage of mechanical separation of the polymer materials is a stage of separation by a shape factor with screening means which make possible the removal of all the materials which are too large and in that the said screening means comprise a screening device, with a rotary drum comprising a calibrated grating (11).

16. A Process according to claim 1, characterized in that the stage of cleaning the polymer materials is carried out in one or more vessels (43) in a liquid medium, with vigorous stirring, at high temperature and with 50 to 70% of polymer materials and 30 to 50% of liquid, the said liquid comprising in particular from 50 to 100% of water, from 0 to 20% of a cleaning agent, from 0 to 30% of an abrasive agent, and a wetting agent, the percentages being expressed by weight.

17. Process according to claim 16, characterized in that the cleaning agent is selected from the group consisting of sodium hydroxide, potassium hydroxide, sodium carbonate, soaps and a mixture of one or more of these.

18. Process according to claim 16, characterized in that the abrasive agent is selected from the group consisting of calcium carbonate powder, talc, silica, alumina and a mixture of one or more of these.

19. A Process according claim 1, characterized in that a screening separation stage, which makes possible the removal of inorganic materials (4), is placed at the very beginning of the process.

20. A Process according claim 1, characterized in that a stage of separation with an air flow of variable power, which makes possible the removal of all the heavy materials (8), is inserted between the first screening separation stage and the grinding stage.

21. A Process according to claim 1, characterized in that a stage of wetting or of immersion or of slushing of the materials with water or an alkaline solution is carried out before the first phase of density separation and before the stage of cleaning the polymer materials.

22. A Process according to claim 1, characterized in that a second grinding stage is inserted between the first phase of density separation and the cleaning stage.

23. A Process according to claim 1, characterized in that the materials which float in the second phase of density separation are recovered and are conveyed in the direction of a centrifuging stage and then of a drying stage, in order to remove any residual liquid.

24. Process according to claim 23, characterized in that, after the drying stage, an air-flow separation stage is carried out which makes possible the removal of all the light materials and/or in that a density separation stage is carried out by virtue of a mechanical device of vibrating table type, after the said air-flow separation stage or after the said drying stage.

25. Process according to claim 23, characterized in that, in order to further separate the polymer materials after the drying stage or after the airflow separation stage or after the stage of density separation by virtue of a mechanical device of vibrating table type, an additional stage of separation by electrostatic sorting or of separation by optical sorting or of separation by ballistic sorting or of separation by differential melting or of separation by sorting in a fluidized bed or of separation by cryogenic grinding or of density separation using a separator in a liquid medium with a density adjusted to a value between 0.9 and 0.95, the liquid medium comprising water and/or methanol and/or ethanol and a wetting agent, is carried out.

26. A Process according to claim 1, characterized in that, after the cleaning stage or after each density separation stage with flotation or after each of the two phases of density separation, a stage of rinsing and of draining and/or of centrifuging the materials which it is desired to recover is carried out.

27. A Process according to claim 1, characterized in that, in order to further purify the polymer materials, separately and successively, a homogenization stage, an extrusion stage, a centrifuging stage, a grading stage, a further homogenization stage and, finally, a bagging stage are carried out.

28. Process according to claim 27, characterized in that an air-flow separation stage, in order to remove fibres and dust, is placed before the extrusion stage.

29. A Process according to claim 1, characterized in that a stage of storage in a silo is inserted at any point between each of the various constituent stages.

30. A Process according to claim 1, characterized in that the various constituent stages are carried out continuously stage by stage or that the various constituent stages are carried out in successive batches with shutdowns and storage of materials after some of the said constituent stages.

31. A Process according to claim 1, characterized in that it makes it possible to recycle PE, PP, PS, ABS, PPs comprising 20 to 40% of filler, PAs, PMMA, Xenoy™ and PVC, it being possible for all these to be extruded or nonextruded.

* * * * *